United States Patent [19]

Tanaka et al.

[11] Patent Number: 5,236,774
[45] Date of Patent: Aug. 17, 1993

[54] POLYBUTENE RESIN LAMINATE

[75] Inventors: Haruhiko Tanaka; Akito Nishimura, both of Yamaguchi, Japan

[73] Assignee: Shell Oil Company, Houston, Tex.

[21] Appl. No.: 854,191

[22] Filed: Mar. 20, 1992

[30] Foreign Application Priority Data

Mar. 20, 1991 [JP] Japan .................................. 3-056804

[51] Int. Cl.⁵ .............................................. B32B 7/02
[52] U.S. Cl. .................................... 428/215; 428/516; 428/520; 428/349
[58] Field of Search ................ 428/516, 349, 520, 215

[56] References Cited

U.S. PATENT DOCUMENTS

| | | |
|---|---|---|
| 4,713,282 | 12/1987 | Yazaki et al. ......................... 428/516 |
| 5,030,506 | 7/1991 | Yamawaki et al. .................. 428/516 |
| 5,093,189 | 3/1992 | Yamawaki ........................... 428/516 |

Primary Examiner—Edith Buffalow
Attorney, Agent, or Firm—James O. Okorafor

[57] ABSTRACT

A polybutene resin laminate comprising an intermediate layer (a) mainly comprising a butene-propylene copolymer (A) containing 15 to 40% by mole of propylene, said copolymer (A) having a melt flow rate in the range of from 0.1 to 30 g/10 min.; and an upper surface layer (b1) and a lower surface layer (b2) disposed on both sides of said intermediate layer (a), said surface layers mainly comprising a polyolefin resin (B). The laminate has excellent transparency, stretchability, flexibility, smoothness, heat sealability and self-adhesion, and may be stretched without undergoing generation of wrinkles and decrease in transparency and fastening properties.

20 Claims, No Drawings

POLYBUTENE RESIN LAMINATE

BACKGROUND OF THE INVENTION

The present invention relates to a polybutene resin laminate, and more particularly, to polybutene resin laminate having excellent transparency, stretchability, flexibility, smoothness, heat sealability and self-adhesion, which may be stretched without undergoing generation of wrinkles and decrease in its transparency and fastening properties. The polybutene resin laminate of the present invention may be preferably used as a stretchable film for packaging foods.

Fresh and cooked foods are displayed and put on sale as a commodity after a so-called prepackaging to keep the food clean and free from dust deposition and contamination, as well as to maintain the freshness of the food. In the prepackaging of the fresh or cooked food, the food is either directly stretch-packaged with a transparent food-packing stretchable film, or stretch-packaged after placing the food on a plastic tray. The food-packaging stretchable film is stretched upon packaging in order to keep the item to be packaged under strictly sealed conditions. The food-packaging stretchable film is required to have a good transparency for visible packaging and for improving the commercial value of the item packaged with the film, and to have excellent air and vapor permeability, and aroma-retaining properties in order to retain the freshness and aroma of the fresh or cooked food, as well as good food-preserving ability at low temperatures. Furthermore, the food-packaging stretchable film is required to have good stretchability and elasticity to endure stretch-packaging with an automatic packaging machine, as well as satisfactory self-adhesion to prevent the film from being peeled off when the package is left for a long period after the packaging.

Films comprising a soft polyvinyl chloride (PVC) have been mainly employed for the food-packaging stretchable films which are required to have the previously disclosed properties.

The soft vinyl chloride resins, however, are liable to suffer from such problems as migration of the plasticizing agent contained in the resin into the food, which may result in hygienic problems, and from generation of hydrogen chloride gas upon incineration after the disposal. Therefore, use of the vinyl chloride film for the food-packaging stretchable film is problematic and development of a substitute for the polyvinyl chloride film is urgently required.

As substitutes for the soft vinyl chloride resin, there have been proposed laminates utilizing the properties of poly 1-butene, which has a high molecular weight among the polyolefins, and has rubbery properties similar to those of the polyvinyl chloride. Such laminates comprise an intermediate layer of poly 1-butene and surface layers of another polyolefin such as polyethylene, ethylene-vinyl acetate copolymer, and the like. For example, food-packaging stretchable films comprising three layers, that is polyolefin/poly 1-butene/polyolefin; ethylene-vinyl acetate copolymer/poly 1-butene/ethylene-vinyl acetate copolymer; and polyolefin/poly-1-butene/polyolefin are disclosed in Japanese Patent Publication No. 62(1987)-27981, Japanese Patent Application KOKAI Nos. 61(1986)-89040 and 1(1989)-166954.

In the above-described conventional laminates comprising at least three layers, the poly 1-butene used for the intermediate layer is either a homopolymer of 1-butene or a copolymer containing more that 85% by mole of 1-butene, resulting in a high crystallinity. Therefore, upon stretch packaging of the laminate film the poly 1-butene intermediate layer experiences oriented-crystallization causing irregular reflection of the light passing through the layer to result in cloudiness and decrease in transparency of the laminate. Also, the intermediate layer comprising a poly 1-butene homopolymer or a copolymer of high 1-butene content has a poor compatibility with the polyolefin surface layers. As a consequence, upon stretching of the laminate film, the surface layers are separated from the intermediate layer at the boundaries therebetween, and the layers are unevenly stretched to cause wrinkles. This results in poor appearance.

SUMMARY OF THE INVENTION

An object of the present invention is to provide a polybutene resin laminate which is preferable for use as a food-packaging stretchable film, which has excellent transparency, stretchability, flexibility, smoothness, heat sealability and self-adhesion, and which may be stretched without undergoing generation of wrinkles and decrease in transparency and fastening properties.

The present invention provides a polybutene resin laminate comprising an intermediate layer (a) mainly comprising a butene-propylene copolymer (A) containing 15 to 40% by mole of propylene, said copolymer (A) having a melt flow rate in the range of from 0.1 to 30 g/10 min.; and an upper surface layer (b1) and a lower surface layer (b2) disposed on both sides of said intermediate layer, said surface layers mainly comprising a polyolefin resin (B).

DETAILED DESCRIPTION OF THE INVENTION

The polybutene resin laminate (hereinafter simply referred to as "laminate") of the present invention is herein described in detail.

The butene-propylene copolymer, which is the main constituent of the intermediate layer in the laminate of the present invention, may have a propylene content of 15 to 40% by mole, preferably 15 to 35% by mole, and most preferably 18 to 30% by mole.

The butene-propylene copolymer may have a melt flow rate at 190° C. of 0.1 to 30 g/10 min., and preferably 0.3 to 20 g/10 min.

The butene-propylene copolymer may preferably have a ratio of weight average molecular weight [Mw] to number average molecular weight ]Mn], Mw/Mn of 2 to 8. The ratio of the weight average molecular weight [Mw] to the number average molecular weight [Mn], Mw/Mn may be determined as described below:

(a) Using standard polystyrenes (monodisperse polystyrene, manufactured by Toso K.K.) whose molecular weight is already known, a calibration curve demonstrating molecular weight, (M) in relation to elution volume, (EV) is depicted by analyzing polystyrene of various molecular weights by GPC (gel permeation chromatography) under the herein disclosed conditions.

Measurement Conditions:
    Equipment: Model 150° C. manufactured by Water Inc.
    Column: TSKGMH-6.6 mm diam. ×600, manufactured by Toso K.K.
    Sample volume: 400 μl
    Temperature: 135° C.

Flow rate: 1 ml/min.

(b) Polymer sample whose molecular weight is to be measured was charged in a flask with a solvent, o-dichlorobenzene to prepare a solution comprising 15 mg of the polymer and 20 ml of the solvent.

To the resulting solution was added a stabilizing agent, 2,6-di-t-butylcresol to a concentration of 0.1% by weight.

The resulting solution was heated to 140° C. for 1 hour, and agitated for another 1 hour to completely dissolve the polymer and the stabilizing agent in the solution.

The solution was then filtered at 135° to 140° C. with a filter of 0.4 μm.

The resulting filtrate was analyzed utilizing GPC under the same measurement conditions as in (a) above to measure the EV. The number average molecular weight [Mn]:

$$[Mn]=\Sigma MiNi/\Sigma Ni,$$

and the weight average molecular weight [Mw]:

$$[Mw]=\Sigma Mi^2Ni/\Sigma MiNi$$

were determined from the EV measured by referring to the calibration curve depicted in (a) to further calculate the ratio of the weight average molecular weight to the number average molecular weight, [Mw]/[Mn].

Further, the butene-propylene copolymer may have a melting temperature, [Tm] determined with a differential scanning calorimeter at about 50° to 110° C., and a crystallinity determined by X-ray diffraction of about 5 to 50%, and preferably about 10 to 45%.

The melting temperature, [Tm] may be measured with a differential scanning calorimeter by elevating the temperature of a sheet, which has been pressed to a thickness of 0.1 mm, and aged for 10 days, from 0° C. to 250° C. at a temperature elevation rate of 10° C./min., and determining the temperature indicating the maximum endothermic peak.

The crystallinity is determined by subjecting a sheet pressured to a thickness of 1.5 mm which has been aged for 10 days to X-ray diffraction.

The butene-propylene copolymer (A) may optionally have another resin blended thereto to a proportion of up to 40% by weight in order to adjust stretchability, flexibility, or tear strength and to improve press workability. Such resins which may be blended with the butene-propylene copolymer include a propylene resin containing at least 70% by mole of propylene, an ethylene resin containing at least 60% by mole of ethylene, and a butene resin containing at least 85% by mole of 1-butene. Illustrative examples of such propylene resin include propylene homopolymer, propylene-ethylene copolymers, propylene-butene copolymers, and propylene-ethylene-butene terpolymers. Illustrative examples of such an ethylene resin include high-density polyethylenes, linear low-density polyethylenes, high-pressure low-density polyethylenes, ethylene-vinyl acetate copolymers, ethylene-unsaturated fatty acid copolymers, ethylene-α-olefin copolymers, ionomer resins produced by crosslinking an ethylene-methacrylic acid copolymer with a metal ion such as zinc ion and sodium ion. Illustrative examples of the butene resin include 1-butene homopolymer and butene-α-olefin copolymers.

The intermediate layer (a) mainly comprising the butene-propylene copolymer (A) as described above may typically h ave a thickness of about 1 to 15 μm, and preferably, a thickness of about 2 to 10 μm in view of good press workability and adaptability to automatic packaging.

The upper surface layer (b1) and the lower surface layer (b2) disposed on both sides of the intermediate layer (a) may primarily comprise a polyolefin resin (B).

The polyolefin resin (B) may typically comprise a homopolymer of an α-olefin containing 2 to 20 carbon atoms, a copolymer of two or more α-olefins containing 2 to 20 carbon atoms, a copolymer of such an α-olefin and a monomer copolymerizable with such an α-olefin, or a crosslinked polymer of such a homopolymer or copolymer.

Exemplary monomers which are copolymerizable with such an α-olefin include (meth)acrylic acid, methyl (meth)acrylate, and vinyl acetate.

Illustrative examples of the polyolefin resin (B) include a polypropylene, a polyethylene, an ethylene-vinyl acetate copolymer, an ethylene-acrylic acid copolymer, an ethylene-ethyl acrylate copolymer, an ethylene-methacrylic acid copolymer, a copolymer of ethylene with another α-olefin, and any one of the above-mentioned polymers crosslinked with a metal ion. The copolymer of ethylene with another α-olefin may preferably contain 60 to 95% by mole of the ethylene. The polyolefin resin (B) may comprise either one, or two or more of the above-mentioned resins. The polyolefin resin (B) may most preferably comprise a linear low-density polyethylene having a density of up to 0.920 g/cm$^3$ or an ethylene-vinyl acetate copolymer containing 10 to 20% by weight of vinyl acetate.

The polyolefin resin (B) may typically have a melt flow rate (MFR) of about 0.1 to 30 g/10 min., and more preferably a melt flow rate of 3 to 20 g/10 min. in view of a good press workability.

Furthermore, the polyolefin resin (B) may preferably have a crystallinity measured by X-ray diffraction of 5 to 60%. The measurement of the crystallinity may be carried out by the same manner as the measurement of the crystallinity of the butene-propylene copolymer as described above.

The polyolefin resin (B) may optionally comprise a surfactant such as a fatty ester of a fatty alcohol, and a polyalkylene ether polyol in order to impart adherability, or anti-fogging or antistatic properties. The polyolefin resin (B) may contain such a surfactant typically in an amount of about 0.5 to 5% by weight.

Each of the upper surface layer (b1) and the lower surface layer (b2), which primarily comprise the polyolefin resin (B), may typically have a thickness of about 1 to 15 μm, and preferably, a thickness of 2 to 10 μm in view of good press workability and adaptability to automatic packaging.

The laminate of the present invention may generally have a thickness of 5 to 30 μm, and preferably, a thickness of 10 to 20 μm in view of the balance between the stretchability and the film strength upon stretch packaging.

The process for producing the laminate of the present invention is not limited to any particular process, and the present laminate may be produced by any of the conventional method(s). Such methods include production of the laminate without any laminate film including production of the laminate comprising three layers without any postreatment such as non-stretching film extrusion, for example co-extrusion blow molding an co-extrusion slot-casting, and lamination by extrusioncoating; and production of a stretched film by stretching the laminate film either monoxially or biaxially under heat subsequent to the production of the laminate film. Among the non-stretching methods, extrusion blow molding is preferred because it is easy to practice, and the resulting laminate product has an excellent balance between its physical properties in machine and transverse direction.

The laminate of the present invention is quite suitable for such an application as food-packaging stretchable film or protective film since the present laminate is capable of uniformly stretching while maintaining the shrinkability, and since the present laminate has an adequate adherability.

The present invention is illustratively described by referring to the following inventive and comparative examples. The invention, however, is by no means limited by these examples.

EXAMPLE 1

A polybutene resin laminate film was produced by co-extrusion blow molding. A 4 μm-thick film of a butene-propylene copolymer having 1-butene content of 20% by mole and melt flow rate at 190° C. of 4.0 was used as an intermediate layer. On both sides of the intermediate layer were laminated, as an upper surface layer and a lower surface layer, 4 μm-thick films of an ethylene-vinyl acetate copolymer having vinyl acetate content of 15% by mole and melt flow rate at 190° C. of 2.0.

The resulting laminate film was measured for its haze at unstretched and 30%-stretched states as described below. The laminate film was also evaluated for its packaging ability by packaging two articles each having a height of 10 cm placed on a tray of foamed polystyrene using an automatic stretch packaging machine, AW-2600Jr manufactured by Teraoka Seiko K.K., and observing the stretchability and appearance of the film after the packaging as described below. The butene-propylene copolymer used for the intermediate layer was measured for its ratio of weight average molecular weight to number average molecular weight, [Mx/Mn] melting temperature, and crystalline by utilizing previously disclosed methods. The results are shown in Table 1.

Haze

Haze of the film was measured at unstretched and 30%-stretched states to examine the degree of cloudiness caused by stretching the film. The film was stretched to such a degree since the degree of stretching may vary in accordance with size and shape of the article packaged, and the film is sometimes partly stretched to a degree as high as 30% or even higher.

Stretchability

The film was observed whether it had been evenly and smoothly stretched upon packaging with the automatic stretch packaging machine.

Appearance

The film was checked for the presence of wrinkles and tear after the packaging with the automatic stretch packaging machine.

EXAMPLES 2 to 6

The procedure of Example 1 was repeated to produce laminate films having the layer formation and the thickness of the layers as shown in Table 1. The butene-propylene copolymer constituting the intermediate layer had the propylene content and the property as shown in Table 1. The resulting laminate films were measured for their haze at unstretched and 30%-stretched states. The laminate films were also evaluated for their packaging ability by observing the stretchability and the appearance of the film upon packaging. The butene-propylene copolymers used for the intermediate layer were measured for their ratio of weight average molecular weight to number average molecular weight, [Mw/Mn] melting temperature, and crystallinity by utilizing previously disclosed methods. The results are shown in Table 1.

TABLE 1

| | | Butene-propylene copolymer used for the intermediate layer | | | | | Haze | | Packaging ability | |
|---|---|---|---|---|---|---|---|---|---|---|
| Example No. | Layer formation (thickness, μm) | Comonomer (content, mol %) | MFR g/10 min | Mw/Mn | Tm, °C. | Crystallinity | unstretched | 30% stretched | Stretchability | Appearance |
| 1 | EVA/BP/EVA (4/4/4) | propylene (20) | 4.0 | 5.2 | 102 | 40 | 1.2 | 1.4 | good | good |
| 2 | EVA/BP/EVA (4/4/4) | propylene (26) | 1.0 | 4.8 | 75 | 33 | 0.9 | 1.1 | good | good |
| 3 | EVA/BP/EVA (3/6/3) | propylene (26) | 1.0 | 4.8 | 75 | 33 | 1.0 | 1.3 | good | good |
| 4 | LLDPE/BP/LLDPE (4/4/4) | propylene (20) | 4.0 | 5.2 | 102 | 40 | 1.2 | 1.4 | good | good |
| 5 | Ionomer/BP/Ionomer (4/4/4) | propylene (20) | 4.0 | 5.2 | 102 | 40 | 1.5 | 1.7 | good | good |
| 6 | EVA/BP/EVA (4/4/4) | propylene (30) | 1.7 | 4.6 | 67 | 28 | 1.3 | 1.4 | good | good |

Notes:
EVA: ethylene-vinyl acetate copolymer having a vinyl acetate content of 15% and a melt flow rate (MFR) of 2.0
BP: butene-propylene copolymer.
LLDPE: linear low density polyethylene having a density od 0.910 g/cm$^3$ and a melt flow rate of 1.0.
Ionomer: an ionomer resin produced by crosslinking an ethylene-methacrylic acid copolymer with zinc ion, having a melt flow rate of 1.5.

COMPARATIVE EXAMPLES 1 to 6

The procedure of Example 1 was repeated to produce films having the layer formation and the thickness of the layers as shown in Table 2. The poly-1-butene resin constituting the intermediate layer had the comonomer content and the property as shown in Table 2. The resulting films were measured for their haze at unstretched and 30%-stretched states. The films were also evaluated for their packaging ability by observing the stretchability and the appearance of the film upon packaging. The poly-1-butene resins used as the intermediate layer were measured for their ratio of weight average molecular weight to number average molecular weight, [Mx/Mn] melting temperature, and crystallinity by utilizing previously disclosed methods. The results are shown in Table 2.

COMPARATIVE EXAMPLE 7

A linear low-density polyethylene (LLDPE) monolayer film having a density of 0.910 g/cm³ and a melt flow rate of 1.0 g/10 min. was evaluated for its haze and packaging ability by repeating the procedure of Example 1. The linear low-density polyethylene was also measured for its ratio of weight average molecular weight to number average molecular weight, [Mw/Mn] melting temperature, and crystallinity by utilizing previously disclosed methods. The results are shown in Table 2.

both sides of said intermediate layer (a), said surface layers comprising a polyolefin resin (B).

2. A polybutene-1 resin laminate as in claim 1, wherein the butene-1-propylene copolymer (A) has a ratio of weight average molecular weight [Mw] to number average molecular weight [Mn], Ms/Mn of 2 to 8.

3. A polybutene-1 resin laminate as in claim 1, wherein the butene-1-propylene copolymer (a) has a melting point of 50° to 110° C.

4. A polybutene-1 resin laminate as in claim 1, wherein the butene-1-propylene propylene copolymer (A) has a crystallinity of 5 to 50%.

5. A polybutene-1 resin laminate as in claim 4, wherein the butene-1-propylene copolymer (A) has a melting point of 10 to 45%.

6. A polybutene-1 resin laminate as in claim 1, wherein the butene-1-propylene copolymer (A) comprises another resin selected from the group consisting of a propylene resin, an ethylene resin and a butene-1 resin blended thereto to a proportion of up to 40% by weight.

TABLE 2

| Comparative Example No. | Layer formation (thickness, μm) | Polybutene resin used for the intermediate layer | | | | | Haze | | Packaging ability | |
|---|---|---|---|---|---|---|---|---|---|---|
| | | Comonomer (content, mol %) | MFR g/10 min | Mw/Mn | Tm, °C. | Crystallinity | unstretched | 30% stretched | Stretchability | Appearance |
| 1 | EVA/homo BP/EVA (4/4/4) | homopolymer (0) | 2.0 | 12 | 125 | 55 | 2.0 | 20.0 | good | poor a) |
| 2 | EVA/BE/EVA (4/4/4) | ethylene (1.5) | 1.0 | 8.3 | 112 | 45 | 1.6 | 8.3 | good | poor b) |
| 3 | LLDPE/BE/LLDPE (4/4/4) | ethylene (1.5) | 1.0 | 8.3 | 112 | 45 | 1.8 | 12.5 | good | poor b) |
| 4 | EVA/BP/EVA (4/4/4) | propylene (3) | 3.2 | 5.3 | 122 | 50 | 1.9 | 9.3 | good | poor b) |
| 5 | EVA/BP/EVA (4/4/4) | propylene (8) | 2.3 | 5.4 | 118 | 46 | 1.5 | 7.4 | good | poor b) |
| 6 | EVA/BP/EVA (4/4/4) | propylene (53) | 3.2 | 5 | 42 | 5 | 1.2 | 1.4 | good | poor c) |
| 7 | LLDPE monolayer film (15) | — | — | — | — | — | 0.9 | 2.5 | partly yielded | poor d) |

Notes:
homo BP: poly 1-butene homopolymer.
BE: butene-ethylene copolymer.
a) partly wrinkled and clouded
b) partly clouded.
c) surface waviness was observed.
d) wrinkles and surface waviness were observed.

The polybutene resin laminate of the present invention has excellent transparency, stretchability, flexibility, smoothness, heat sealability and self-adhesion. It can be stretched without a decrease in its transparency and fastening properties, usually observable by the absence of wrinkles. Therefore, the polybutene resin laminate of the present invention is quite useful as a food-packaging stretchable film.

While this invention has been described in detail for the purpose of illustration, it is not to be construed as limited thereby but it intended to cover all changes and modifications within the spirit and scope thereof.

What is claimed is:

1. A polybutene resin laminate comprising an intermediate layer (a) comprising a butene-propylene copolymer (A) containing 15 to 40% by mole of propylene, said copolymer (A) having a melt flow rate in the range of from 0.1 to 30 g/10 min.; and an upper surface layer (b1) and a lower surface layer (b2) disposed on both sides of said intermediate layer (a), said surface layers comprising a polyolefin resin (B).

7. A polybutene-1 resin laminate as in claim 1, wherein the intermediate layer (A) has a thickness of 1 to 15 μm.

8. A polybutene-1 resin laminate as in claim 7, wherein the intermediate layer (A) has a thickness of 2 to 10 μm.

9. A polybutene-1 resin laminate as in claim 1, wherein the polyolefin resin (B) comprises a resin selected from the group consisting of a homopolymer of an α-olefin containing 2 to 20 carbon atoms, a copolymer of two or more α-olefins containing 2 to 20 carbon atoms, a copolymer of the α-olefin and a monomer copolymerizable with the α-olefin, or a crosslinked polymer of the homopolymer or the copolymer.

10. A polybutene-1 resin laminate as in claim 1, wherein the polyolefin resin (B) comprises a linear low-density polyethylene having a density of up to 0.920 g/cm³ or an ethylene-vinyl acetate copolymer containing 10 to 20% by weight of vinyl acetate.

11. A polybutene-1 resin laminate as in claim 1, wherein the polyolefin resin (B) has a melt flow rate (MFR) of about 0.1 to 30 b/10 min.

12. A polybutene-1 resin laminate as in claim 11, wherein the polyolefin resin (B) has a melt flow rate (MFR) of about 3 to 10 g/10 min.

13. A polybutene-1 resin laminate as in claim 1, wherein the polyolefin resin (B) has a crystallinity of 5 to 60%.

14. A polybutene-1 resin laminate as in claim 13, wherein the polyolefin resin (B) comprises a surfactant.

15. A polybutene-1 resin laminate as in claim 14, wherein said surfactant is selected from the group consisting of a fatty ester of a fatty alcohol, and a polyalkenyl ether polyol.

16. A polybutene-1 resin laminate as in claim 14, wherein said surfactant is present in an amount of about 0.5 to 5 wt %.

17. A polybutylene-1 resin laminate as in claim 1, wherein each of the upper surface layer (b1) and the lower surface layer (b2) has a thickness of 1 to 15 μm.

18. A polybutene-1 resin laminate as in claim 17, wherein each of the upper surface layer (b1) and the lower surface layer (b2) has a thickness of 2 to 20 μm.

19. A polybutene-1 resin laminate as in claim 1, wherein the laminate has a thickness of 5 to 30 μm.

20. A polybutylene-1 resin laminate as in claim 1, wherein the laminate is stretched or unstredched.

* * * * *